United States Patent
Cho et al.

(10) Patent No.: US 12,521,063 B2
(45) Date of Patent: Jan. 13, 2026

(54) WEARABLE DEVICE AND METHOD FOR MEASURING BIOMETRIC INFORMATION

(71) Applicant: Samsung Electronics Co., Ltd., Suwon-si (KR)

(72) Inventors: Sunghwan Cho, Suwon-si (KR); Hyejung Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/991,214

(22) Filed: Nov. 21, 2022

(65) Prior Publication Data
US 2023/0079489 A1    Mar. 16, 2023

Related U.S. Application Data

(63) Continuation of application No. PCT/KR2021/014914, filed on Oct. 22, 2021.

(30) Foreign Application Priority Data

Oct. 22, 2020  (KR) .................. 10-2020-0137755

(51) Int. Cl.
  *A61B 5/318*    (2021.01)
  *A61B 5/00*    (2006.01)
  (Continued)

(52) U.S. Cl.
  CPC .......... *A61B 5/681* (2013.01); *A61B 5/02427* (2013.01); *A61B 5/332* (2021.01); *A61B 5/7278* (2013.01); *A61B 5/742* (2013.01)

(58) Field of Classification Search
  CPC ..... A61B 5/681; A61B 5/02427; A61B 5/332; A61B 5/7278; A61B 5/742;
  (Continued)

(56) References Cited

U.S. PATENT DOCUMENTS 10,052,035 B2   8/2018   Martin et al.
10,492,726 B2   12/2019  Dusan et al.
(Continued)

FOREIGN PATENT DOCUMENTS

CN    110558960 A    12/2019
KR    10-1286402 B1   7/2013
(Continued)

OTHER PUBLICATIONS

Office Action dated Jun. 12, 2025, issued in Korean Patent Application No. 10-2020-0137755.

*Primary Examiner* — Benjamin J Klein
*Assistant Examiner* — Alisha J Sircar
(74) *Attorney, Agent, or Firm* — Jefferson IP Law, LLP

(57) ABSTRACT

A wearable device is provided. The wearable device includes a first sensor having a light-emitting part and a light-receiving part, a second sensor having at least one electrode, and at least one processor electrically connected to the first sensor and the second sensor, wherein the at least one processor acquires PPG signal data by using the first sensor for a first time while the wearable device is worn on a user's body, acquires ECG signal data by using the second sensor for the first time for which the PPG signal is acquired, determines an inter-beat interval calculation model, based on the result of a comparison between the PPG signal data and the ECG signal data, and acquires, based on the determined inter-beat interval calculation model, an inter-beat interval of the user from PPG signal data measured for a second time after the first time.

20 Claims, 15 Drawing Sheets

(51) Int. Cl.
*A61B 5/024* (2006.01)
*A61B 5/332* (2021.01)

(58) Field of Classification Search
CPC ............ A61B 5/02416; A61B 5/02438; A61B 5/6844; A61B 5/7221; A61B 5/7267; A61B 5/0245; A61B 5/7264; A61B 5/746
See application file for complete search history.

(56) References Cited

U.S. PATENT DOCUMENTS

| | | | |
|---|---|---|---|
| 11,246,493 | B2 | 2/2022 | Kim et al. |
| 11,375,930 | B2 | 7/2022 | Jeong et al. |
| 2008/0200823 | A1 | 8/2008 | Cho et al. |
| 2017/0156666 | A1* | 6/2017 | Surbur ................ A61B 5/681 |
| 2018/0235487 | A1* | 8/2018 | Paul .................. A61B 5/02416 |
| 2018/0279891 | A1* | 10/2018 | Miao ................ A61B 5/02416 |
| 2018/0279898 | A1* | 10/2018 | Pamula ............. A61B 5/02416 |
| 2018/0325457 | A1* | 11/2018 | Ghosh ................. A61B 5/352 |
| 2019/0038185 | A1 | 2/2019 | Arnold et al. |
| 2019/0313947 | A1* | 10/2019 | Li ....................... A61B 5/067 |
| 2020/0100693 | A1* | 4/2020 | Velo ....................... G16H 50/20 |
| 2020/0215246 | A1 | 7/2020 | Tal et al. |
| 2020/0297223 | A1 | 9/2020 | Cho |
| 2020/0345253 | A1* | 11/2020 | Chen ................... A61B 5/6824 |
| 2021/0030359 | A1 | 2/2021 | Jeong et al. |
| 2021/0030367 | A1 | 2/2021 | Cho et al. |

FOREIGN PATENT DOCUMENTS

| | | |
|---|---|---|
| KR | 10-2015-0067047 A | 6/2015 |
| KR | 10-2016-0075585 A | 6/2016 |
| KR | 10-2018-0036282 A | 4/2018 |
| KR | 10-1885311 B1 | 9/2018 |
| KR | 10-2018-0120533 A | 11/2018 |
| KR | 10-2019-0093432 A | 8/2019 |
| KR | 10-2019-0100814 A | 8/2019 |
| KR | 10-2019-0113552 A | 10/2019 |
| KR | 10-2020-0112095 A | 10/2020 |
| KR | 10-2021-0015005 A | 2/2021 |
| KR | 10-2021-0018202 A | 2/2021 |
| KR | 10-2347155 B1 | 1/2022 |
| WO | 2018/025257 A1 | 2/2018 |

* cited by examiner

WEARABLE DEVICE AND METHOD FOR MEASURING BIOMETRIC INFORMATION

CROSS-REFERENCE TO RELATED APPLICATION(S)

This application is a continuation application, claiming priority under § 365(c), of an International application No. PCT/KR2021/014914, filed on Oct. 22, 2021, which is based on and claims the benefit of a Korean patent application number 10-2020-0137755, filed on Oct. 22, 2020, in the Korean Intellectual Property Office, the disclosure of which is incorporated by reference herein in its entirety.

TECHNICAL FIELD

The disclosure relates to a technology for measuring biometric information using a plurality of sensors in a wearable electronic device.

BACKGROUND ART

The inter-beat interval changes according to the contraction and relaxation of the heart controlled by the nervous system, and may have a specific pattern according to an individual's biological characteristics. In addition, within an individual, the value fluctuates according to the control of the sympathetic and parasympathetic nerves. The standard method for measuring the interval between heartbeats is to measure the electrocardiogram and calculate the distance between the R points of the electrocardiogram. In addition, the interval between heartbeats can be indirectly calculated from the blood flow measured using a photoplethysmogram (PPG). PPG signal can be measured in various parts of the body (e.g., a hand, an ear, a wrist), and the accuracy of measuring the interval between heartbeats varies depending on the quality of the PPG signal in each part. Methods for measuring the interval between heartbeats from the PPG signal include finding the vertex of the PPG signal and calculating the interval (peak to peak calculation method), finding and calculating the starting point of the signal (valley to valley calculation method), and differentiation of the signal There are various methods, such as finding the part with the largest slope from the value and calculating it (zero-crossing point calculation method).

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

On the other hand, when calculating the interval between heartbeats based on only the existing PPG signal, it is difficult to determine how accurate it is compared to the standard method measured using the electrocardiogram (ECG) sensor, so this value is used to provide health services to users. It is difficult to provide. In particular, since the calculation method of the most accurate algorithm for the interval between heartbeats may differ depending on the specific photoplethysmogram (PPG) signal waveform each individual has, it is difficult to improve the accuracy without using an algorithm optimized for each individual.

Aspects of the disclosure are to address at least the above-mentioned problems and/or disadvantages and to provide at least the advantages described below. Accordingly, an aspect of the disclosure is to provide a technology for measuring biometric information using a plurality of sensors in a wearable electronic device.

Additional aspects will be set forth in part in the description which follows and, in part, will be apparent from the description, or may be learned by practice of the presented embodiments.

Solution to Problem

In accordance with an aspect of the disclosure, a wearable device is provided. The wearable device includes a first sensor having a light emitting unit and a light receiving unit, a second sensor having one or more electrodes, and at least one processor electrically connected to the first sensor and the second sensor, The at least one processor acquires PPG signal data by using the first sensor for a first time while the wearable device is worn on the user's body, and obtains the PPG signal data during the first time when the PPG signal is acquired. 2 to acquire ECG signal data using a sensor, determine an inter-heart interval calculation model based on a comparison result of the PPG signal data and the ECG signal data, and based on the determined inter-heart interval calculation model, the first interval between heartbeats of the user may be obtained from the PPG signal data measured for the second time after the time.

In accordance with another aspect of the disclosure, a method of operating the wearable device is provided. The method includes an operation of acquiring PPG signal data using a first sensor for a first time in a state in which the wearable device is worn on a user's body, wherein the PPG signal data is acquired Acquiring ECG signal data using a second sensor for the first time period, determining an inter-heart interval calculation model based on a comparison result of the PPG signal data and the ECG signal data, and the determined inter-heart interval based on the calculation model, obtaining an interval between heartbeats of the user from PPG signal data measured for a second time after the first time.

Advantageous Effects of Invention

The wearable device according to various embodiments of the disclosure may improve the accuracy of measuring the interval between heartbeats by providing the most optimal personalized algorithm.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

Figure 1:
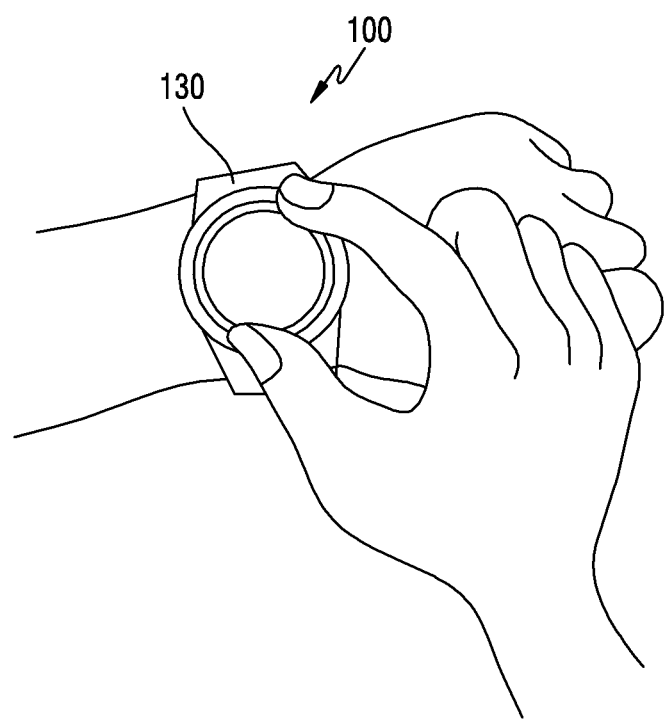
FIG. 1 illustrates wearing a wearable device on a part of a body according to an embodiment of the disclosure.

FIG. 1 illustrates wearing a wearable device on a part of a body according to an embodiment of the disclosure.

Referring to FIG. 1, according to an embodiment of the disclosure, a wearable device 100 may be a smart watch, as illustrated. The wearable device 100 is not limited thereto, and may be various types (e.g., watch, band, ring, or glasses) of devices usable while being attached to a user's body.

According to an embodiment of the disclosure, the wearable device 100 may include a strap 130, and thus may be attached to the user's body by winding the strap 130 on the user's wrist. The wearable device 100 is not limited thereto, may be attached to various parts of the user's body according to the type, size or the like of the wearable device 100. For example, the wearable device 100 may also be attached to a hand, the back of a hand, a finger, a nail, a fingertip, etc.

Figure 2:
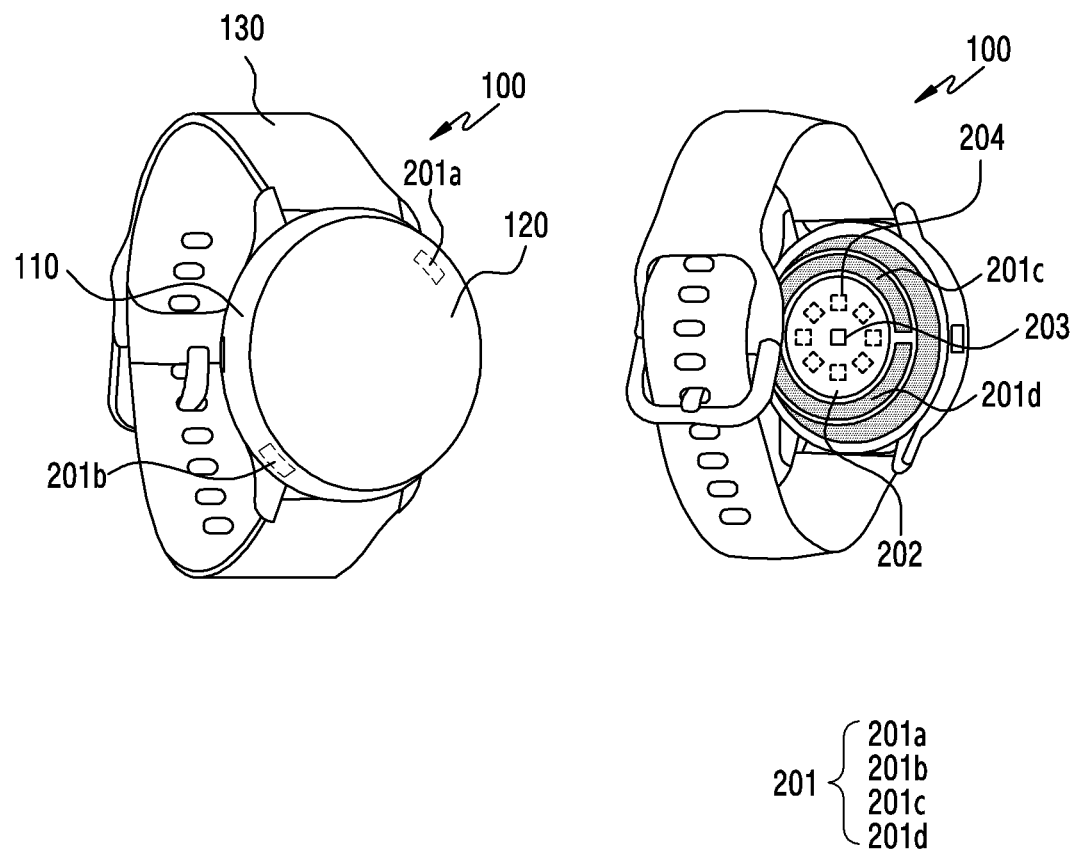
FIG. 2 is a perspective view of a wearable device according to an embodiment of the disclosure.

FIG. 2 is a perspective view of a wearable device according to an embodiment of the disclosure.

Referring to FIG. 2, the wearable device 100 may include a housing 110, a display 120, a strap 130, and an electrode 201. According to an embodiment of the disclosure, in the wearable device 100, at least one of the illustrated elements may be omitted, or another element may be additionally included.

According to an embodiment of the disclosure, the housing 110 may include a top surface, a bottom surface, and a side surface part surrounding the space between the top surface and the bottom surface. According to an embodiment of the disclosure, the display 120 may be exposed through one region of the housing 110.

According to an embodiment of the disclosure, the electrode 201 may be disposed in at least a portion of the housing 110. For example, a first electrode 201a and a second electrode 201b may be disposed in the top surface or the side surface part of the housing 110, and a third electrode 201c and a fourth electrode 201d may be disposed in the bottom surface of the housing 110. According to an embodiment of the disclosure, the shape or size of the electrode may be variously formed.

According to an embodiment of the disclosure, a PPG sensor 202 may be exposed through the bottom surface of the housing 110. According to an embodiment of the disclosure, the PPG sensor 202 may include a light-emitting module 203 and a light-receiving module 204. According to an embodiment of the disclosure, the light-emitting module 203 may include light emitting diodes (LEDs) having various wavelengths. For example, the light-emitting module 203 may include an infrared ray (IR) LED, a Red LED, a Green LED, and/or a Blue LED. According to an embodiment of the disclosure, the light-receiving module 204 may include at least one photodiode (PD).

According to an embodiment of the disclosure, the display 120 may display biometric data of a user, acquired through a biosensor. According to an embodiment of the disclosure, the display 120 may switch an output screen based on user input to a portion (e.g., a bezel) of the housing 110 or an input on the display 120. For example, the display 120 may switch from a watch screen to a biometric data screen (e.g., a heart rate) in response to a user input.

According to an embodiment of the disclosure, the strap 130 may be connected to at least a portion of the housing 110, and may be detachably bind the wearable device 100 to a part (e.g., a wrist or an ankle) of the user's body. According to an embodiment of the disclosure, the user of the wearable device 100 may adjust the strap 130 to increase the degree of close contact.

The above-described structure of the wearable device 100 is exemplary. In various embodiments of the disclosure, the wearable device 100 may be implemented differently from FIG. 2. The wearable device 100 may have various types/structures suitable for performing a biometric data measurement method disclosed herein.

Figure 3:
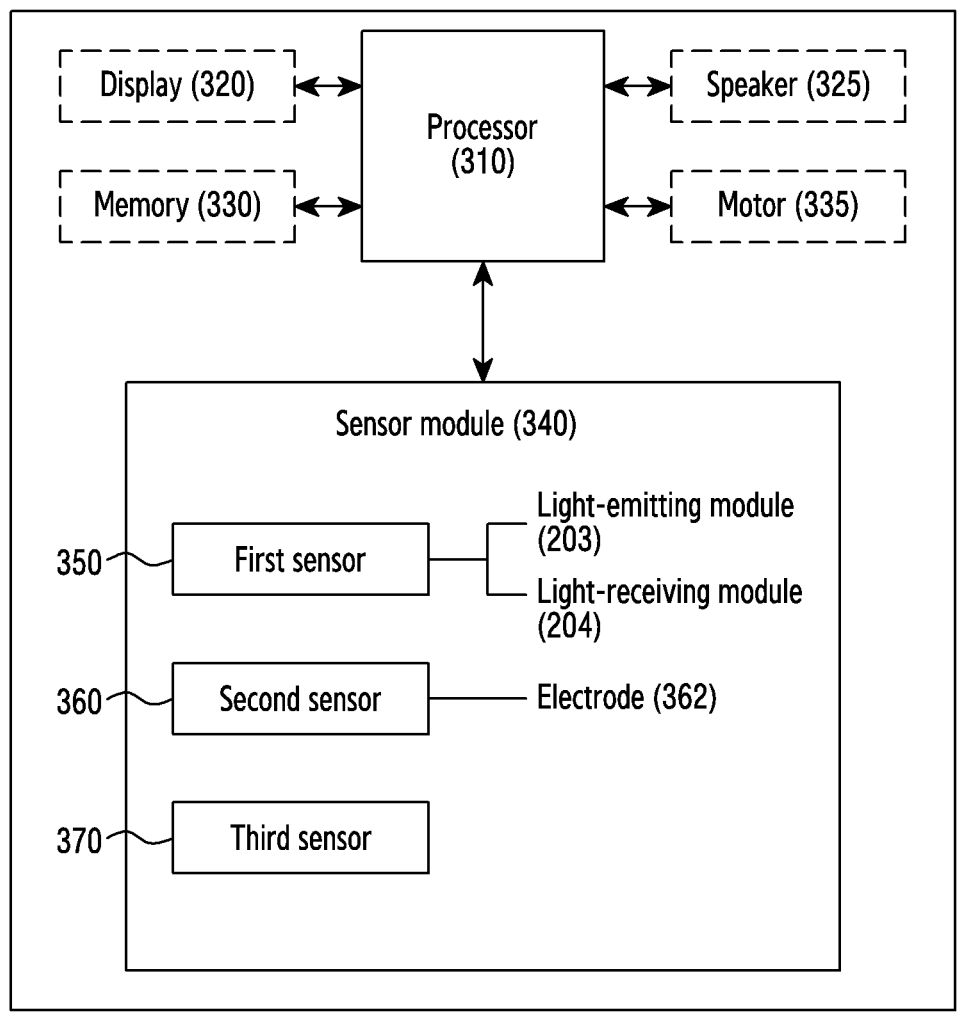
FIG. 3 is a block diagram of a wearable device according to an embodiment of the disclosure.

FIG. 3 is a block diagram of a wearable device according to an embodiment of the disclosure.

Referring to FIG. 3, the wearable device 100 according to an embodiment may include a processor 310, a display 320, a memory 330, a speaker 325, a motor 335 or a sensor module 340. In various embodiments of the disclosure, the wearable device 100 may include an additional element in addition to the elements illustrated in FIG. 3, or at least one of the elements illustrated in FIG. 3 may be omitted.

According to an embodiment of the disclosure, the processor 310 may use instructions stored in the memory 330 to control at least one different element of the wearable device 100 and/or to perform data processing or operation about communication. According to an embodiment of the disclosure, the processor 310 may include at least one of a central processing unit (CPU), a graphic processing device (GPU), a micro controller unit (MCU), a sensor hub, a supplementary processor, communication processor, an application processor, an application specific integrated circuit (ASIC), and a field programmable gate arrays (FPGA), and may have multiple cores.

According to an embodiment of the disclosure, the processor 310 may acquire biometric information of a user from the sensor module 340. According to an embodiment of the disclosure, the processor 310 may calculate an inter-beat interval based on a PPG signal and an ECG signal acquired from the sensor module 340. The detailed content related to an operation of the processor 310 will be described later with reference to FIG. 4.

According to an embodiment of the disclosure, the display 320 may display various types of contents (e.g., text, an image, a video, an icon, and/or a symbol). According to an embodiment of the disclosure, the shape of the display 320 may correspond to the shape of the housing 110, and may be various shapes, such as a circular shape, an elliptical shape, or a polygonal shape. According to an embodiment of the disclosure, the display 320 may be coupled to or disposed adjacent to a touch sensing circuit or a pressure sensor capable of measuring the strength (pressure) of a touch. According to an embodiment of the disclosure, the display 320 may display biometric information of the user according to command of the processor 310. For example, the biometric information of the user may be displayed as a numerical and/or a graph on the display 320 according to a command of the processor 310. According to an embodiment of the disclosure, the display 320 may provide a guide about a biometric information measurement method according to a command of the processor 310.

According to an embodiment of the disclosure, the memory 330 may store various types of data acquired or used by at least one element (e.g., the processor) of the wearable device 100. According to an embodiment of the disclosure, the memory 330 may store personal information of the user, such as the age, the height, the weight, or medical information (e.g., a personal health record) of the user.

According to an embodiment of the disclosure, the memory 330 may store biometric data of the user acquired by the sensor module 340. For example, the memory 330 may store an inter-beat interval value based on ECG signal data or PPG signal data acquired by the sensor module 340. Further, for example, the memory 330 may store, based on a biometric signal acquired by the sensor module 340, biometric data such an electrocardiogram (ECG), a bioelectric impedance, a heart rate, blood pressure, a blood sugar level, a stress level, oxygen saturation (SpO2), and maximal oxygen consumption, VO2max).

According to an embodiment of the disclosure, the sensor module 340 may detect the state of the user, may provide a signal corresponding to the detected state. According to an embodiment of the disclosure, the sensor module 340 may include a first sensor 350, a second sensor 360, and a third sensor 370.

According to an embodiment of the disclosure, the first sensor 350 may include a PPG sensor (e.g., the PPG sensor 202 in FIG. 2). According to an embodiment of the disclosure, the first sensor 350 may include a light-emitting module 203 and a light-receiving module 204. According to an embodiment of the disclosure, a signal processing module (not shown) may control the light-emitting module 203 and the light-receiving module 204. According to an embodiment of the disclosure, the signal processing module may include a sensor driver controller, configured to directly control a sensor, and an analog-to-digital converter (ADC). According to an embodiment of the disclosure, the signal processing module may further include other elements (e.g., an amplifier and/or a filter) which have not been illustrated in FIG. 3. According to an embodiment of the disclosure, the signal processing module may be implemented as a microprocessor.

According to an embodiment of the disclosure, the signal processing module may drive at least one LED of the light-emitting module 203. According to an embodiment of the disclosure, the signal processing module may process (e.g., amplify and/or filter) a signal detected by the light-receiving module 204. For example, the signal processing module may convert a current signal, detected by the light-receiving module 204, to a voltage signal, and may convert the processed voltage signal to a digital signal.

According to an embodiment of the disclosure, the second sensor 360 may include at least one of an electrocardiogram (ECG) sensor, a galvanic skin response (GSR) sensor, an electroencephalography (EEG) sensor, and a bioelectrical impedance analysis (BIA) sensor. According to an embodiment of the disclosure, the second sensor 360 may be electrically connected to at least one electrode 362 (e.g., the electrode 201 in FIG. 2).

According to an embodiment of the disclosure, the third sensor 370 may include at least one of an acceleration sensor, a proximity sensor, a gyro sensor, a temperature sensor, an iris sensor, a temperature/humidity sensor, an illuminance sensor, or a time-of-flight (TOF) sensor. According to an embodiment of the disclosure, the processor 310 may determine the condition of the user or the external environment of the user by using the third sensor 370.

The sensor module 340 herein may be referred to as at least one sensor, a sensor circuitry, etc.

Figure 4:
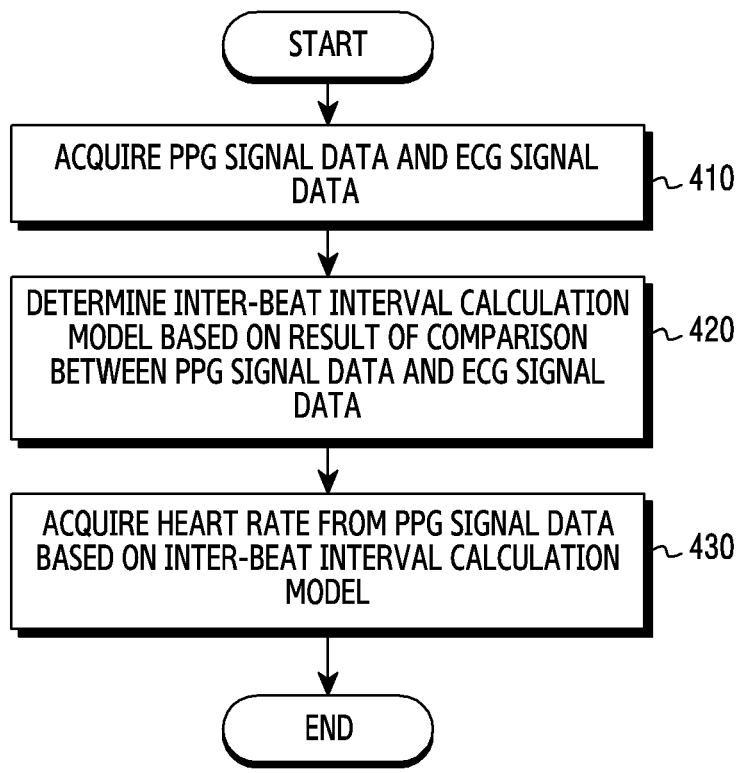
FIG. 4 is a flowchart regarding acquiring biometric data in a wearable device according to an embodiment of the disclosure.

FIG. 4 is a flowchart regarding acquiring biometric data in a wearable device according to an embodiment of the disclosure.

In operation 410, the processor 310 according to an embodiment may acquire PPG signal data and ECG signal data through a PPG sensor (e.g., the PPG sensor 202 in FIG. 2) and an ECG sensor. For example, the processor 310 may acquire the PPG signal data and the ECG signal data together. According to an embodiment of the disclosure, an electronic device (e.g., the wearable device 100 in FIG. 1) may acquire the PPG signal data and the ECG signal data while the electronic device is worn on a part (e.g., wrist) of a user's body through a strap (e.g., the strap 130 in FIG. 1).

According to an embodiment of the disclosure, the processor 310 may provide a guide for measuring ECG and PPG together. For example, the wearable device 100 may display a UI for inducing measurement of biometric information through the display 320. In another example, the wearable device 100 may output sound through a speaker 225, or may output a vibration through a motor 335. According to an embodiment of the disclosure, the wearable device 100 may output at least two of the UI, the sound, or the vibration.

According to another embodiment of the disclosure, when the user measures ECG, the processor 310 may simultaneously measure a PPG signal in a background manner without providing a notification indicating measurement of the PPG signal. According to an embodiment of the disclosure, the processor 310 may provide a notification indicating that an ECG signal and a PPG signal are measured together. For example, the processor 310 may display, through the display, a UI indicating that two signals are simultaneously measured. In another example, the processor 310 may output sound through the speaker 225, or may output a vibration through the motor 335. According to an embodiment of the disclosure, the processor 310 may output at least two of the UI, the sound, or the vibration.

In operation 420, the processor 310 according to an embodiment of the disclosure may determine an inter-beat interval calculation model based on the result of comparing the PPG signal data with the ECG signal data. According to an embodiment of the disclosure, the processor 310 may calculate an inter-beat interval based on each of the PPG signal data and the ECG signal data. According to an embodiment of the disclosure, the processor 310 may determine an inter-beat interval calculation algorithm, which is most suitable for PPG measurement, based on the inter-beat interval calculated from the ECG signal data. According to an embodiment of the disclosure, the processor 310 may determine an inter-beat interval calculation model based on an algorithm and a parameter in which the sum or average of errors is equal to or less than a predetermined range when the inter-beat interval calculated from the ECG signal data is compared with the inter-beat interval calculated from the PPG signal data.

In operation 430, the processor 310 according to an embodiment of the disclosure may acquire a heart rate and/or an inter-beat interval from the PPG signal data based on the inter-beat interval calculation model. For example, the processor 310 may measure PPG by using an algorithm or a parameter that is most optimized for the user.

According to an embodiment of the disclosure, the processor 310 may repeatedly perform operations 410 to 430.

Figure 5:
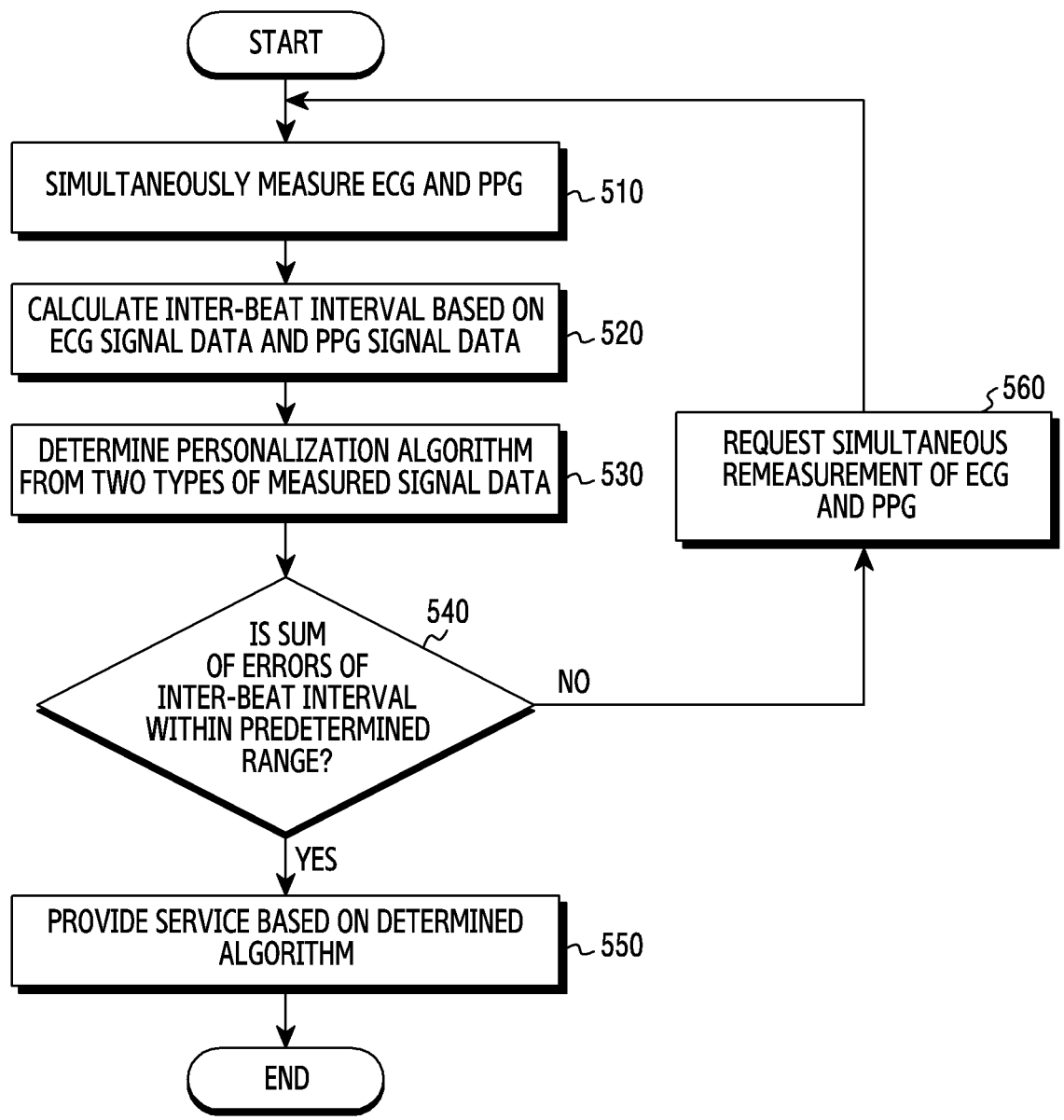
FIG. 5 is a flowchart regarding determining a personalization algorithm based on acquired biometric data in a wearable device according to an embodiment of the disclosure.

FIG. 5 is a flowchart regarding determining a personalization algorithm based on acquired biometric data in a wearable device according to an embodiment of the disclosure. In relation to a description of FIG. 5, contents that are similar to or correspond to the above-described content may be briefly described or may be omitted.

In operation 510, the processor 310 according to an embodiment of the disclosure may simultaneously measure ECG and PPG through an ECG sensor and a PPG sensor. For example, the processor 310 may measure ECG and PPG together for a first time. According to an embodiment of the disclosure, the processor 310 may automatically start to measure a heart rate when sensing, through a PPG sensor, that a first part of the body is brought into contact with at least one electrode. According to another embodiment of the disclosure, the processor 310 may detect that the wearable device 100 enters a measurement mode, and may start to measure a heart rate when sensing, through a PPG sensor, that the first part of the body is brought into contact with at least one electrode. For example, a method for entering the measurement mode may be one of biometric measurement menu execution, application execution, or dragging on the display 120.

In operation 520, the processor 310 according to an embodiment of the disclosure may calculate an inter-beat interval based on ECG signal data and PPG signal data. The processor 310 according to an embodiment may calculate an inter-beat interval by using one among a method for detecting peaks of ECG signal and/or PPG signal data to calculate an interval (peak-to-peak calculation method), a method for detecting a starting point of a signal to perform calculation (valley-to-valley calculation method), or a method for detecting a portion of a signal having a largest slope from differential values of the signal to perform calculation (zero-crossing point calculation method).

In operation 530, the processor 310 according to an embodiment of the disclosure may determine a personalization algorithm from the measured ECG signal data and PPG signal data. The processor 310 according to an embodiment may determine, as a personalization algorithm, an algorithm in which errors of two inter-beat intervals calculated from the measured ECG signal data and PPG signal data are smallest.

In operation 540, the processor 310 according to an embodiment may determine whether the sum of the errors of two inter-beat intervals calculated based on the ECG signal data and the PPG signal data is within a predetermined range.

The processor 310 according to an embodiment may determine that the sum of the errors of two inter-beat intervals calculated based on the ECG signal data and the PPG signal data is within the predetermined range. Thus, in operation 550, the processor 310 may measure PPG through the PPG sensor based on the determined personalization algorithm According to an embodiment of the disclosure, the processor 310 may acquire, based on the personalization algorithm, an inter-beat interval by using only the PPG sensor. According to an embodiment of the disclosure, the processor 310 may acquire an inter-beat interval by using the ECG sensor and the PPG sensor together. According to an embodiment of the disclosure, the processor 310 may calculate the inter-beat interval from the PPG signal data acquired using the PPG sensor. According to various embodiments of the disclosure, the inter-beat interval may be calculated by various methods, and a description thereof will be made with reference to FIG. 7B. According to the above-described embodiment of the disclosure, the electronic device can provide an optimum personalized algorithm, thereby improving accuracy of biometric information measurement.

According to an embodiment of the disclosure, the processor 310 may provide a service based on the inter-beat interval calculated based on the PPG signal data. For example, the service may include providing biometric information using an inter-beat interval (e.g., a stress level, a heart rate, a respiratory rate, an electrocardiogram of atrial fibrillation, the degree of heart health).

The processor 310 according to an embodiment of the disclosure may determine that the sum of errors of two inter-beat intervals calculated based on the ECG signal data and the PPG signal data is outside the predetermined range. Thus, in operation 560, the processor 310 may induce remeasuring of ECG and PPG. According to an embodiment of the disclosure, the processor 310 may also provide a guide regarding a good measurement posture. According to an embodiment of the disclosure, the processor 310 may display a UI, which induces the remeasuring, through the display 320. In another example, the wearable device 100 may output sound through the speaker 225, or may output a vibration through the motor 335. According to an embodiment of the disclosure, the wearable device 100 may output at least two of the UI, the sound, or the vibration.

Figure 6A:
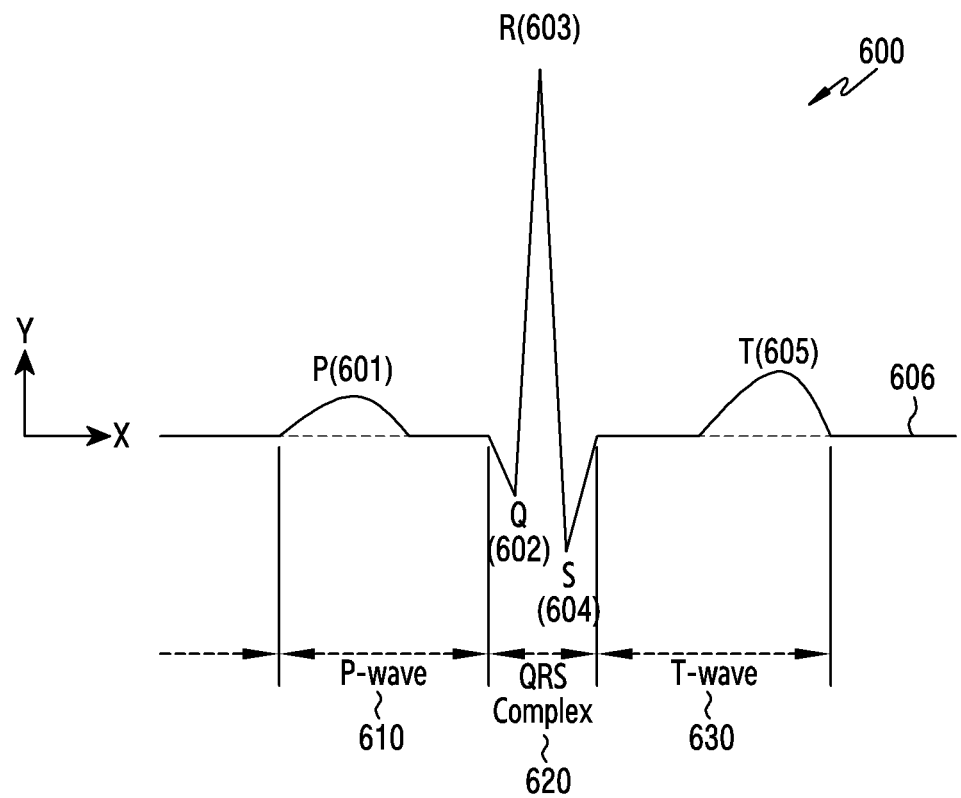
FIG. 6A illustrates an ECG signal measured through an ECG sensor of a wearable device according to an embodiment; of the disclosure.

FIG. 6A illustrates an ECG signal according to an embodiment of the disclosure.

Figure 6B:
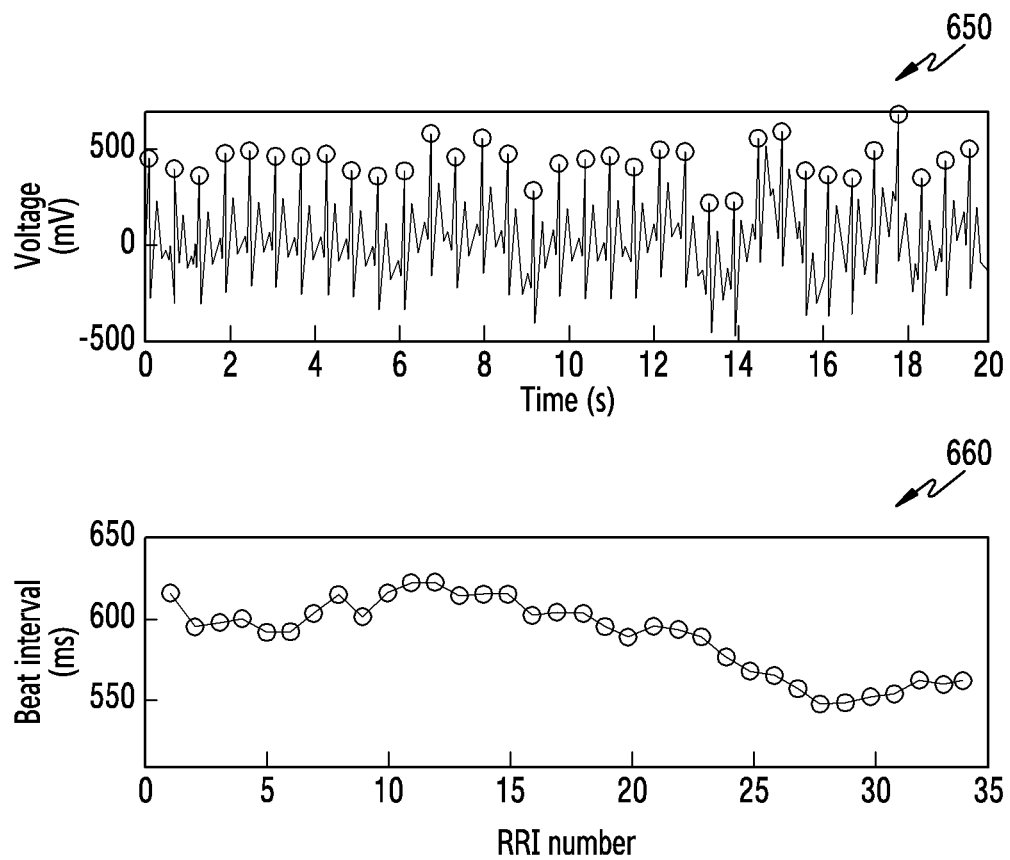
FIG. 6B is a view for describing an ECG signal measured through an ECG sensor of a wearable device according to an embodiment of the disclosure.

FIG. 6B is a view for describing an ECG signal measured through an ECG sensor of a wearable device according to an embodiment of the disclosure.

Referring to FIG. 6A, the X-axis is a time axis, and the Y-axis represents the magnitude of an electrocardiogram signal 600 according to time by voltage. An isoelectric line 606 is a baseline voltage of the electrocardiogram signal 600. The isoelectric line 606 is measured by the voltage of potential lines connected a T-wave 630 and a P-wave 610, and becomes a reference for measuring the electrocardiogram signal. Further, a wave or an interval is used to analyze the electrocardiogram signal 600. A P-wave 610 is an electrical signal measured while the atrium is depolarized. The depolarization refers to a phenomenon in which the polarity of heart muscle cells is changed from a negative pole to a positive pole while heart muscle contracts. The P-wave 610 is a wave which becomes a start of one cycle of the electrocardiogram signal and is positioned before a QRS-complex 620. The QRS-complex 620 is an electrical signal measured during rapid depolarization of a ventricle, and typically has a higher voltage than the P-wave 610. A T-wave 630 is an electrical signal measured during repolarization. The repolarization refers to a phenomenon in which the polarity of heart muscle cells returns from the positive pole to the negative pole while the heart muscle is relaxed. A fiducial point refers to a predetermined point on a wave or an interval. For example, the fiducial point may be a starting point of the P-wave, an end point of the P-wave, a vertex 601 of the P-wave, a starting point of the QRS-complex, an end point of the QRS-complex, vertexes 602, 603, and 604 of the QRS-complex, a starting point of the T-wave, an end point of the T-wave, or a vertex 605 of the T-wave. Further, as illustrated in FIG. 6A, fiducial point P(601) may be a vertex of the P-wave 610, fiducial point Q(602) may be a first lowest point of the QRS-complex 620, fiducial point R(603) may be a highest point of the QRS-complex 620, and fiducial point S(604) may be a second lowest point of the QRS-complex 620. According to various embodiments of the disclosure, a wave, an interval, a complex, or a fiducial point may be variously distinguished and generated on a graph of the electrocardiogram signal 600, and is not limited to those described in the specification.

Referring to FIG. 6B, the processor 310 may calculate an inter-beat interval 660 from ECG signal data 650 acquired by an ECG sensor. For example, the processor 310 may calculate the inter-beat interval 660 by calculating the distance (RR interval (RRI)) between fiducial points R (e.g., fiducial point R(603) in FIG. 6A) of a QRS complex of an ECG signal. According to various embodiments of the disclosure, the inter-beat interval may be calculated by various methods, and is not limited to those described in the specification.

Figure 7A:
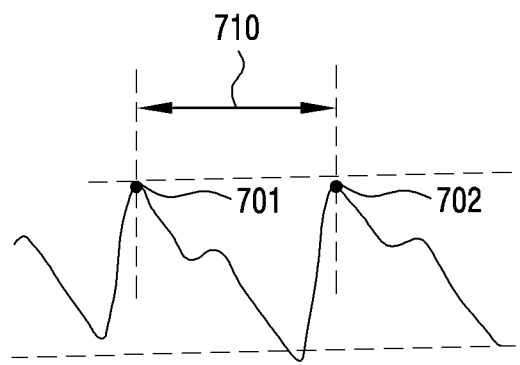
FIG. 7A illustrates a PPG signal measured through a PPG sensor of a wearable device according to an embodiment of the disclosure.

FIG. 7A illustrates a PPG signal according to an embodiment of the disclosure.

Figure 7B:
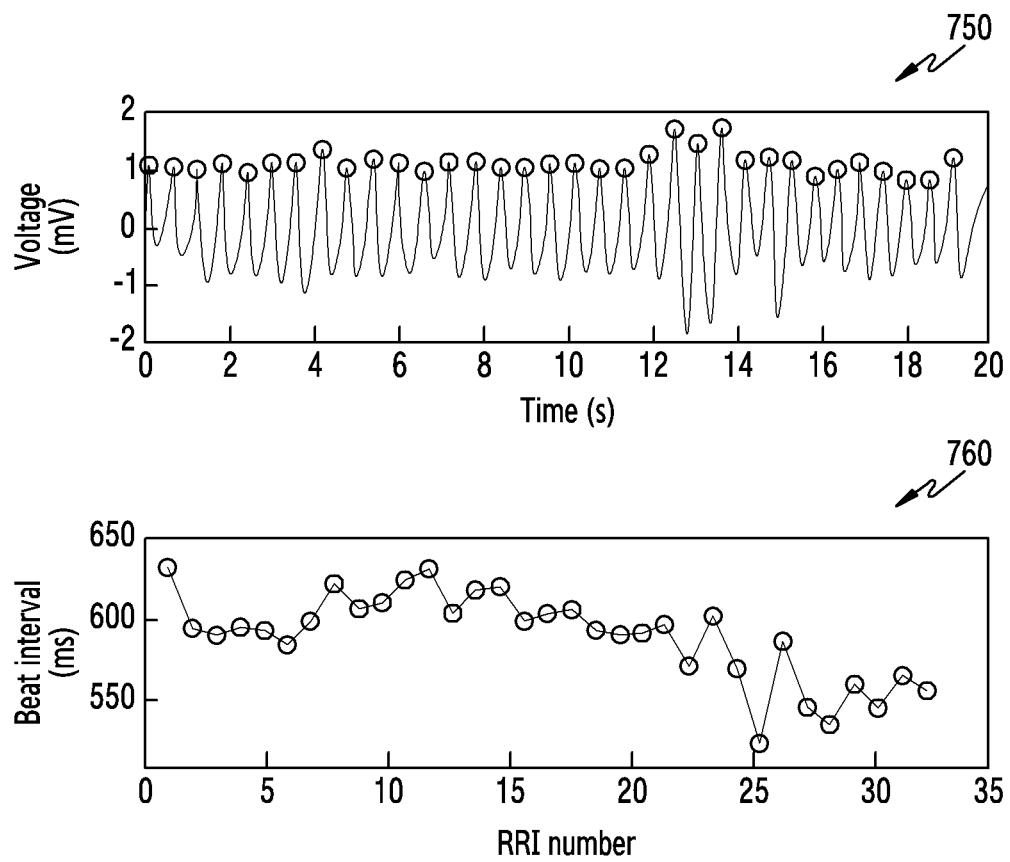
FIG. 7B is a view for describing a PPG signal measured through a PPG sensor of a wearable device according to an embodiment of the disclosure.

FIG. 7B is a view for describing a PPG signal measured through a PPG sensor of a wearable device according to an embodiment of the disclosure.

Referring to FIG. 7A, the X-axis is a time axis, and the Y-axis represents the magnitude of a PPG signal 700 according to time by voltage. According to an embodiment of the disclosure, in a PPG signal 700 measured through a PPG sensor, the amount of light absorbed increases as the amount of blood flowing in blood vessels under a user's skin increases, and thus the magnitude of the PPG signal 700 may increase. When at least one LED of the PPG sensor emits light, a part of the light may reach arterial blood, venous blood, skeleton, and/or skin tissues (e.g., epidermis and/or dermis) of the user. For example, a part of light, which has reached the arterial blood, may be changed due to a change in the amount of the arterial blood according to the user's pulse, and absorbed. A part thereof may form the PPG signal 700. The value of the PPG signal 700 may indicate the difference between the amount of systolic blood flow and the amount of diastolic blood flow of the user. PPG is expressed as a shape, such as starting point to a maximum contraction point of left ventricle contraction, reduction of the contraction, a point of expansion of an aorta wall and a reduction point of blood outflow, and an elastic wave of the valve and the myocardium. According to an embodiment of the disclosure, a pulse cycle may be measured using maximum contraction points 701 and 702 of left ventricle contraction. For example, the pulse cycle may be measured by calculating the distance 710 between the maximum contraction points of left ventricle contraction.

According to various embodiments of the disclosure, a graph of the PPG signal 700 may be variously generated, and is not limited to those described in the specification.

Referring to FIG. 7B, the processor 310 may calculate an inter-beat interval 760 from a PPG signal data 750 acquired using a PPG sensor. For example, the processor 310 may calculate inter-beat interval 760 by calculating the distance between top points (e.g., the maximum contraction points 701 and 702 in FIG. 7A) of the PPG signal. According to various embodiments of the disclosure, the inter-beat interval may be calculated by various methods, and is not limited to those described in the specification.

Figure 8:
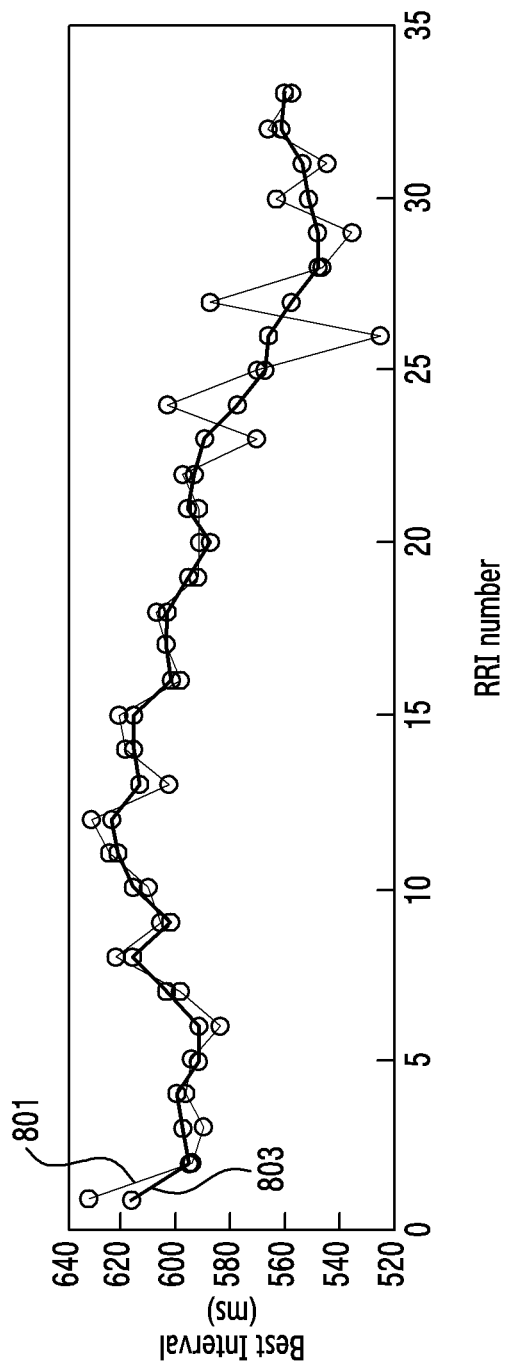
FIG. 8 illustrates comparison between inter-beat intervals acquired based on an ECG signal and a PPG signal of a wearable device according to an embodiment of the disclosure.

FIG. 8 illustrates comparison between inter-beat intervals acquired based on an ECG signal and a PPG signal of a wearable device according to an embodiment of the disclosure.

Referring to FIG. 8, according to an embodiment of the disclosure, the processor 310 may compare an inter-beat interval 801 acquired based on a PPG signal with an inter-beat interval 803 acquired based on an ECG signal to calculate an error therebetween. For example, the processor 310 may compare two signals to calculate the mean absolute error, the maximum error, the minimum error, or the standard deviation of error. According to an embodiment of the disclosure, the processor 310 may compared the calculated error with a designated value to determine whether to continuously provide a service. For example, when the mean absolute error is greater than a specific reference value, the processor 310 may withhold a service using an inter-beat interval.

Figure 9:
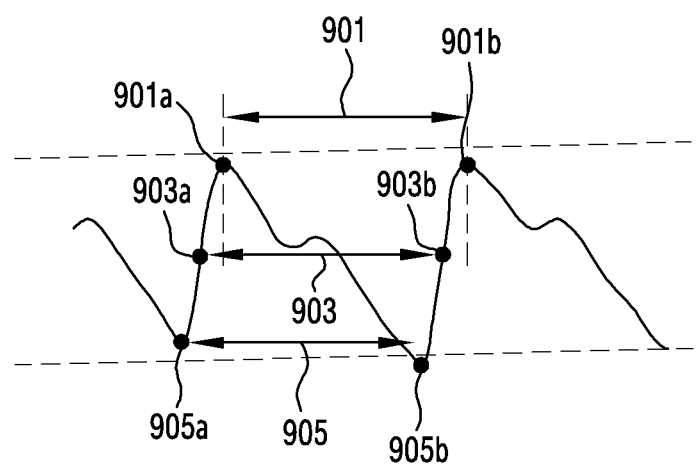
FIG. 9 is a view for describing an inter-beat interval calculation method based on the waveform of a PPG signal of a wearable device according to an embodiment of the disclosure.

FIG. 9 is a view for describing an inter-beat interval calculation method based on the waveform of a PPG signal of a wearable device according to an embodiment of the disclosure.

Referring to FIG. 9, according to various embodiments of the disclosure, the processor 310 may calculate an inter-beat interval by various methods based on the waveform of a PPG signal. The accuracy of each method may vary depending on the state of a signal and the feature of a PPG signal for each person. For example, in the case of a PPG signal that has first peak point which is clearly shown and that has a large amplitude and thus is easily distinguished, it may be advantageous to calculate an inter-beat interval 901 by using highest points 901a and 901b. In another example, in the case of a PPG signal having a waveform in which an amplitude is large but the heights of a first peak point and a second peak point are approximately equal to each other, it may be advantageous to calculate an inter-beat interval 905 by using lowest points 905a and 905b. In another example, when the amplitude of a signal is small and the highest point and/or the lowest can be changed due to the presence of noise, it may be advantageous to calculate an inter-beat interval 903 by using maximum slope points 903a and 903b. According to an embodiment of the disclosure, the processor 310 may calculate an error between a PPG signal-based inter-beat interval calculated by each calculation method and an inter-beat interval based on an ECG signal simultaneously measured with a PPG signal, thereby determining an algorithm optimized for each person. According to an embodiment of the disclosure, the processor 310 may measure a PPG signal based on the determined algorithm.

Figure 10:
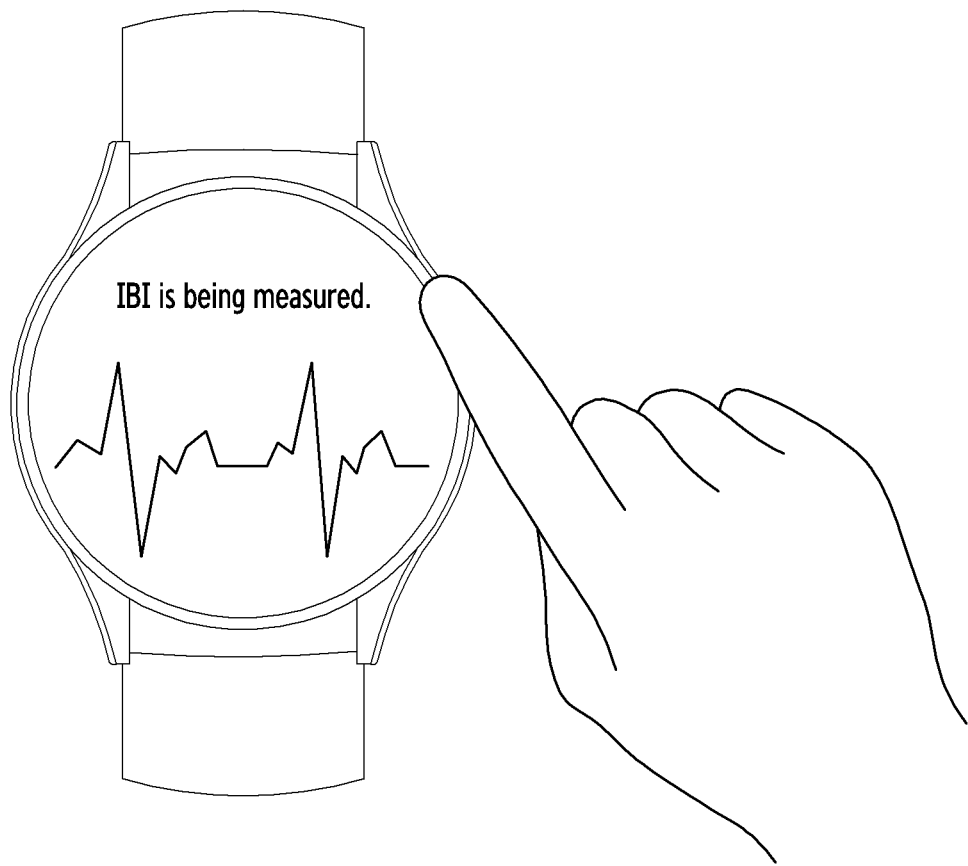
FIGS. 10, 11, and 12 illustrate a UI displayed on a display in a wearable device according to various embodiments of the disclosure.
Figure 11:
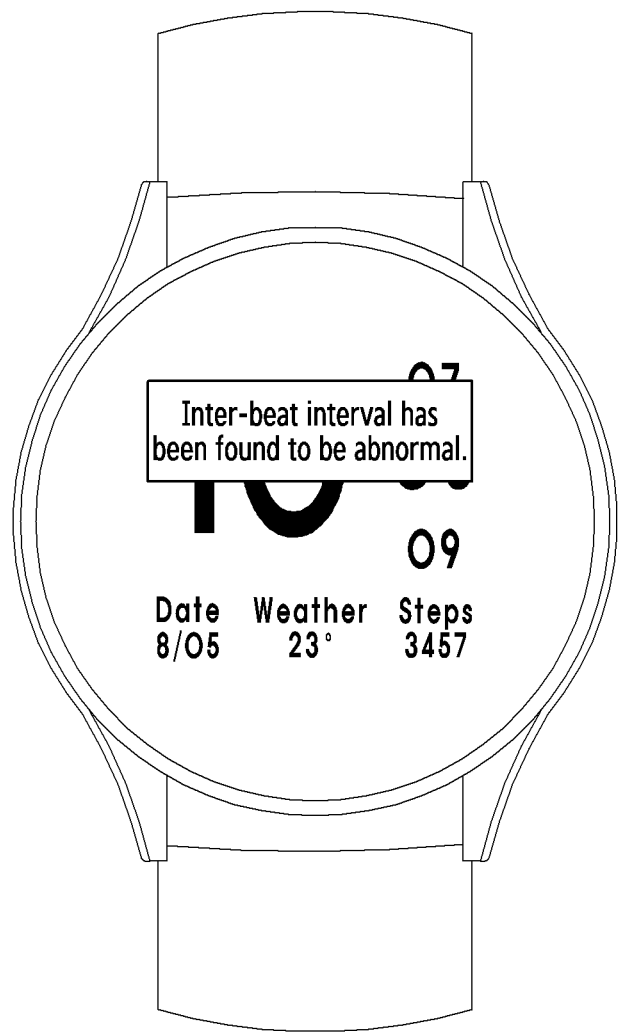
Figure 12:
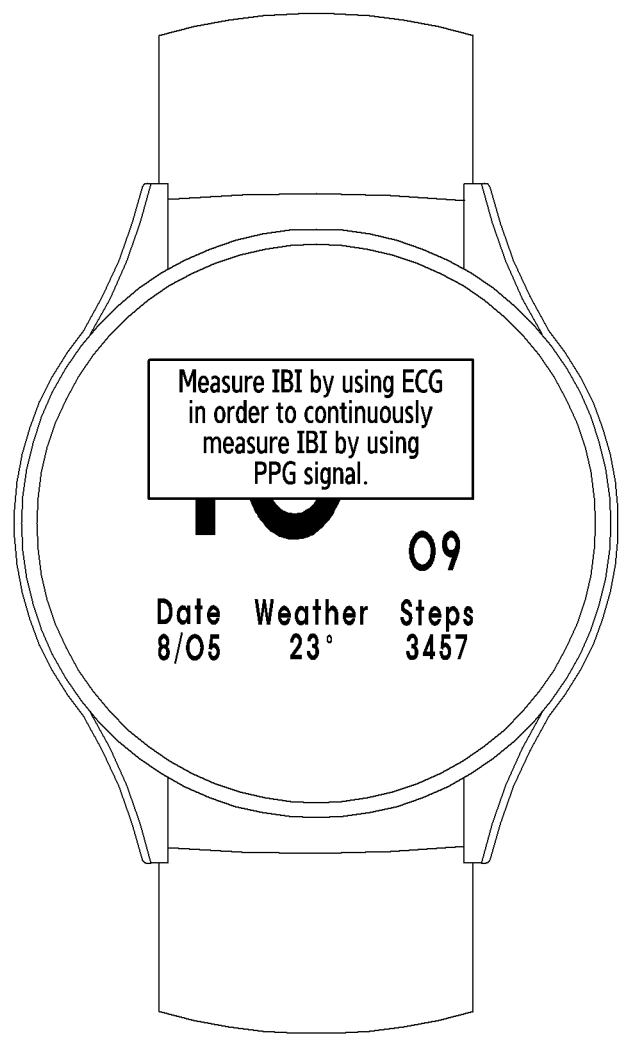

FIGS. 10, 11, and 12 illustrate a UI displayed on a display in a wearable device according to various embodiments of the disclosure. In relation to a description of FIGS. 10 to 12, contents which corresponds to or is identical or similar to the above-described contents, may be briefly described or may be omitted.

Referring to FIG. 10, a wearable device (e.g., the wearable device 100 in FIG. 1) according to an embodiment may measure user information through an ECG sensor and a PPG sensor. According to an embodiment of the disclosure, when it is determined that biometric information of a user is normally measured, the processor 310 may output a notification message through a display. For example, the processor 310 may output a notification message (e.g., "IBI is being measured.") for indicating that the biometric information of the user is normally measured.

According to an embodiment of the disclosure, the processor 310 may simultaneously display an ECG signal and a PPG signal through the display. For example, the processor 310 may display the ECG signal and the PPG signal as numerical values and/or graphs.

According to the above-described embodiment of the disclosure, the wearable device 100 may provide the biometric information of the user as a UI including a numerical value and/or a graph, thereby assisting the user to intuitively recognize the measurement result.

Referring to FIG. 11, a wearable device (e.g., the wearable device 100 in FIG. 1) according to an embodiment may provide a notification when it is determined that biometric information of a user acquired through an ECG sensor and/or a PPG sensor is outside a normal range. For example, in order to notify of the fact that the biometric information of the user is outside the normal range, the processor 310 may output a notification message (e.g., "an inter-beat interval has been found to be abnormal.") through a display. In another example, the processor 310 may provide a vibration through a motor in order to notify of the fact that the biometric information of the user is outside the normal range. In another example, the processor 310 may output a voice notification or sound through a speaker in order to notify of the fact that the biometric information of the user is outside the normal range. According to an embodiment of the disclosure, the processor 310 may output at least two of the UI, the sound, or the vibration.

Referring to FIG. 12, a wearable device (e.g., the wearable device 100 in FIG. 1) according to an embodiment may provide a notification for inducing ECG measurement. According to an embodiment of the disclosure, when it is determined that there is a need to correct an inter-beat interval calculation model, the processor 310 may provide, through a display, a notification message for inducing ECG measurement. For example, when the deviation between two inter-beat intervals, calculated based on ECG signal data and PPG signal data, repeatedly exceeds an average range, the processor 310 may determine that it is necessary to correct the model. According to an embodiment of the disclosure, the processor 310 may provide a notification message (e.g., "Measure IBI by using ECG in order to continuously measure IBI by using a PPG signal.") for notifying of the fact that the correction is needed. According to the above-described embodiment of the disclosure, when the accuracy of an inter-beat interval based on a PPG signal is reduced due to a change in the condition of the user's health, the wearable device 100 may induce ECG measurement to improve the accuracy of PPG measurement.

Figure 13:
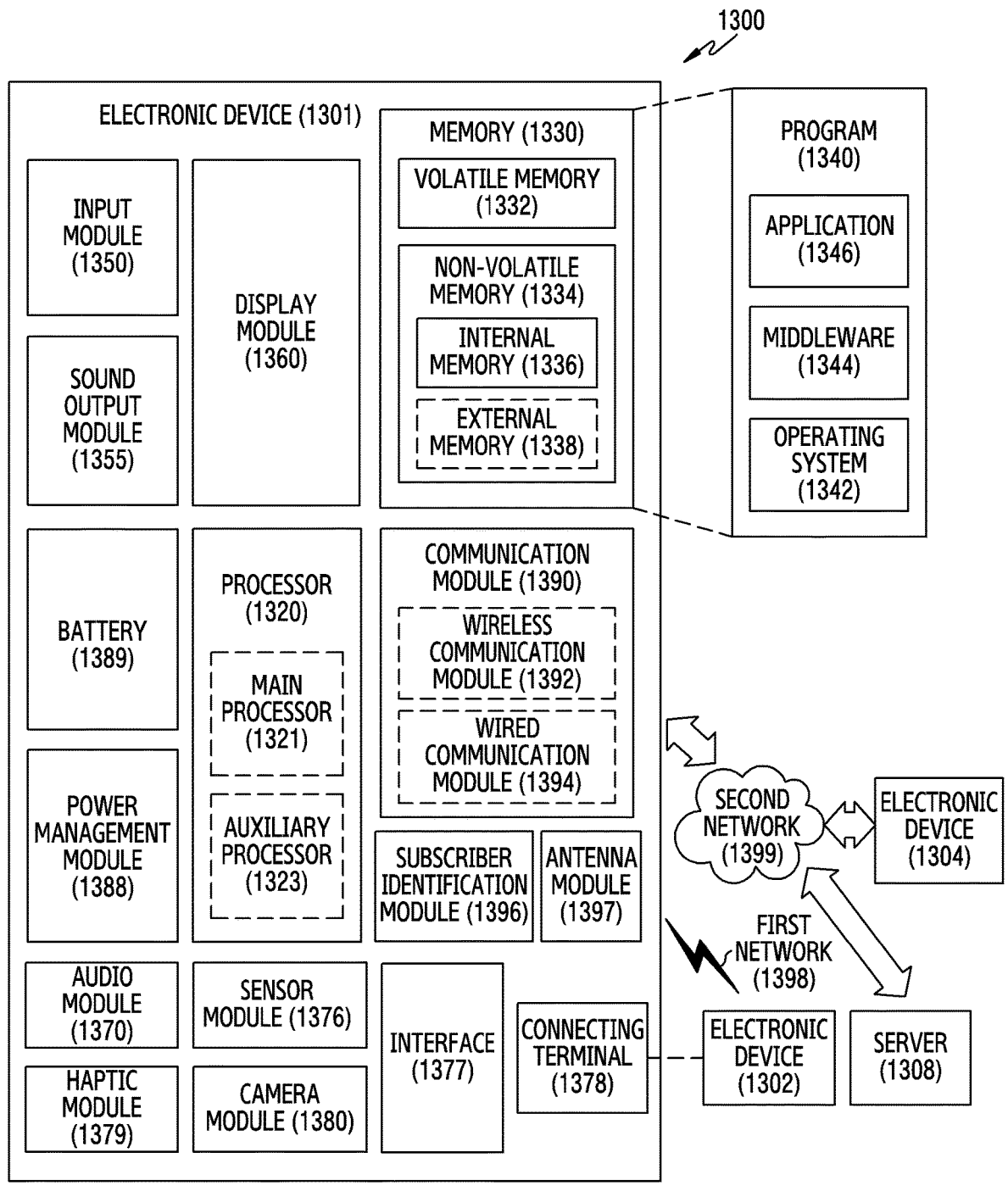
FIG. 13 is a block diagram of an electronic device in a network environment according to an embodiment of the disclosure.

FIG. 13 is a block diagram illustrating an electronic device 1301 in a network environment 1300 according to an embodiment of the disclosure.

Referring to FIG. 13, an electronic device 1301 in a network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment of the disclosure, the electronic device 1301 may communicate with the electronic device 1304 via the server 1308. According to an embodiment of the disclosure, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments of the disclosure, at least one of the components (e.g., the connecting terminal 1378) may be omitted from the electronic device 1301, or one or more other components may be added in the electronic device 1301. In some embodiments of the disclosure, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment of the disclosure, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment of the disclosure, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment of the disclosure, the auxiliary processor 1323 (e.g., an image signal processor or a communication processor) may be implemented as part of another component (e.g., the camera module 1380 or the communication module 1390) functionally related to the auxiliary processor 1323. According to an embodiment of the disclosure, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment of the disclosure, the display module 1360 may include a touch sensor adapted to detect a touch, or a pressure sensor adapted to measure the intensity of force incurred by the touch.

The audio module 1370 may convert a sound into an electrical signal and vice versa. According to an embodiment of the disclosure, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment of the disclosure, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment of the disclosure, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment of the disclosure, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1379 may include, for example, a motor, a piezoelectric element, or an electric stimulator.

The camera module 1380 may capture a still image or moving images. According to an embodiment of the disclosure, the camera module 1380 may include one or more lenses, image sensors, image signal processors, or flashes.

The power management module 1388 may manage power supplied to the electronic device 1301. According to one embodiment of the disclosure, the power management module 1388 may be implemented as at least part of, for example, a power management integrated circuit (PMIC).

The battery 1389 may supply power to at least one component of the electronic device 1301. According to an embodiment of the disclosure, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment of the disclosure, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment of the disclosure, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment of the disclosure, the antenna module 1397 may include an antenna including a radiating element including a conductive material or a conductive pattern formed in or on a substrate (e.g., a printed circuit board (PCB)). According to an embodiment of the disclosure, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment of the disclosure, another component (e.g., a radio frequency integrated circuit (RFIC)) other than the radiating element may be additionally formed as part of the antenna module 1397.

According to various embodiments of the disclosure, the antenna module 1397 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment of the disclosure, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment of the disclosure, the external electronic device 1304 may include an internet-of-things (IoT) device. The server 1308 may be an intelligent server using machine learning and/or a neural network. According to an embodiment of the disclosure, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1340) including one or more instructions that are stored in a storage medium (e.g., an internal memory 1336 or an external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

As described above, a wearable device 100 according to an embodiment may include a first sensor having a light-emitting part and a light-receiving part, a second sensor having at least one electrode, and at least one processor electrically connected to the first sensor and the second sensor, wherein the at least one processor acquires PPG signal data by using the first sensor for a first time while the wearable electronic device is worn on a user's body, acquires ECG signal data by using the second sensor for the first time for which the PPG signal is acquired, determines an inter-beat interval calculation model, based on the result of a comparison between the PPG signal data and the ECG signal data, and acquires, based on the determined inter-beat interval calculation model, an inter-beat interval of the user from PPG signal data measured for a second time after the first time.

In the wearable device 100 according to an embodiment of the disclosure, the at least one processor may determine the inter-beat interval calculation model, based on at least one of an inter-beat interval calculation algorithm and a parameter.

The wearable device 100 according to an embodiment of the disclosure may further include a memory, and the memory may store instructions which cause an inter-beat interval to be acquired based on the determined model.

The wearable device 100 according to an embodiment of the disclosure may be configured to periodically update the determined model, based on the acquired ECG signal data and the acquired PPG signal data.

The wearable device 100 according to an embodiment of the disclosure may determine, based on the result of comparison between the acquired ECG signal data and the acquired PPG signal data, whether to continuously measure the inter-beat interval.

The wearable device 100 according to an embodiment of the disclosure may determine one reference point among a highest point, a lowest point, and a maximum slope point of the acquired ECG signal data and the acquired PPG signal data, and may determine the inter-beat interval calculation model, based on the result of comparing the interval between the determined reference points.

The wearable device 100 according to an embodiment may provide a notification associated with the measurement of the inter-beat interval.

The wearable device 100 according to an embodiment may further include a display, and the at least one processor may provide the notification through the display.

The wearable device 100 according to an embodiment may further include a motor, and may provide the notification by outputting a vibration through the motor.

The wearable device 100 according to an embodiment may further include a speaker, and may provide the notification by outputting a voice guide or sound through the speaker.

The wearable device 100 according to an embodiment may further include a third sensor, wherein the third sensor may include at least one of an acceleration sensor, a proximity sensor, a gyro sensor, a temperature sensor, an iris sensor, a temperature/humidity sensor, an illuminance sensor, and TOF sensor.

In the wearable device 100 according to an embodiment of the disclosure, the second sensor may be electrically connected to multiple electrodes.

In the wearable device 100 according to an embodiment of the disclosure, at least one electrode of the multiple electrodes may be disposed on the bottom surface of the housing, and at least one electrode may be disposed on the side surface or the top surface of the housing.

The wearable device 100 according to an embodiment of the disclosure may automatically start inter-beat interval measurement when sensing, through the second sensor, that a first part of a body is brought into contact with at least one of the multiple electrodes.

The wearable device 100 according to an embodiment of the disclosure may detect that the wearable device enters a measurement mode, and may start inter-beat interval measurement when sensing, through the second sensor, that the first part of the body is brought into contact with at least one of the multiple electrodes.

As described above, a method of operating a wearable device 100 according to an embodiment may include acquiring PPG signal data by using a first sensor for a first time while the wearable device is worn on a user's body, acquiring ECG signal data by using a second sensor for the first time for which the PPG signal data is acquired, determining an inter-beat interval calculation model, based on the result of a comparison between the PPG signal data and the ECG signal data, and acquiring, based on the determined inter-beat interval calculation model, an inter-beat interval of the user from PPG signal data measured for a second time after the first time.

In the method of the wearable device 100 according to an embodiment of the disclosure, the inter-beat interval calculation model may be determined based on at least one of an inter-beat interval calculation algorithm and a parameter.

The method of the wearable device 100 according to an embodiment may include storing, in a memory, instructions which cause an inter-beat interval to be acquired based on the determined model.

The method of the wearable device 100 according to an embodiment may include determining, based on the result of comparison between the acquired ECG signal data and the acquired PPG signal data, whether to continuously measure the inter-beat interval.

The method of the wearable device 100 according to an embodiment may include determining one reference point among a highest point, a lowest point, and a maximum slope point of the acquired ECG signal data and the acquired PPG signal data, and determining the inter-beat interval calculation model, based on the result of comparing intervals between the determined reference points.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
a first sensor having a light-emitting part and a light-receiving part;
a second sensor having at least one electrode;
at least one processor electrically connected to the first sensor and the second sensor; and
memory storing instructions,
wherein the instructions, which are executed by the at least one processor individually or collectively, cause the wearable device to:
acquire photoplethysmogram (PPG) signal data by using the first sensor for a first time while the wearable device is worn on a user's body,
acquire electrocardiogram (ECG) signal data by using the second sensor for the first time for which the PPG signal is acquired,
calculate a first inter-beat interval of the PPG signal data for the first time and a second inter-beat interval of the ECG signal data for the first time,
determine a personalization algorithm for acquiring an inter-beat interval of the user, the personalization algorithm in which errors between the first inter-beat interval and the second inter-beat interval are smallest,
determine whether a sum of the errors between the first inter-beat interval and the second inter-beat interval is within a predetermined range,
determine an inter-beat interval calculation model based on the errors, if the sum of the errors between the first inter-beat interval and the second inter-beat interval is within the predetermined range, and
calculate, based on the determined inter-beat interval calculation model, an inter-beat interval of the user from PPG signal data measured for a second time after the first time, and
wherein the PPG signal data or the ECG signal data for the first time is re-acquired based on the personalization algorithm, if the sum of the errors between the first inter-beat interval and the second inter-beat interval is outside the predetermined range.

2. The wearable device of claim 1, wherein the instructions, which are executed by the at least one processor individually or collectively, further cause the wearable device to determine the inter-beat interval calculation model, based on at least one of an inter-beat interval calculation algorithm or a parameter.

3. The wearable device of claim 1, wherein the instructions, which are executed by the at least one processor individually or collectively, further cause the wearable device to acquire a heart rate based on the determined model.

4. The wearable device of claim 3, wherein the instructions, which are executed by the at least one processor individually or collectively, further cause the wearable device to periodically update the determined model, based on the acquired ECG signal data and the acquired PPG signal data.

5. The wearable device of claim 1, wherein the instructions, which are executed by the at least one processor individually or collectively, further cause the wearable device to determine, based on a result of a comparison between the first inter-beat interval and the second inter-beat interval, whether to continuously measure the inter-beat interval.

6. The wearable device of claim 1, wherein the instructions, which are executed by the at least one processor individually or collectively, further cause the wearable device to:
determine one reference point among a highest point, a lowest point, and a maximum slope point of the acquired ECG signal data and the acquired PPG signal data, and
determine the inter-beat interval calculation model, based on a result of comparing an interval between the determined reference points.

7. The wearable device of claim 1, wherein the instructions, which are executed by the at least one processor individually or collectively, further cause the wearable device to provide a notification associated with the measurement of the inter-beat interval.

8. The wearable device of claim 7, further comprising a display, wherein the instructions, which are executed by the at least one processor individually or collectively, further cause the wearable device to provide the notification through the display.

9. The wearable device of claim 7, further comprising a motor, wherein the instructions, which are executed by the at least one processor individually or collectively, further cause the wearable device to provide the notification by outputting a vibration through the motor.

10. The wearable device of claim 7, further comprising a speaker, wherein the instructions, which are executed by the at least one processor individually or collectively, further cause the wearable device to provide the notification by outputting a voice guide or sound through the speaker.

11. The wearable device of claim 1, further comprising a third sensor, wherein the third sensor comprises at least one of an acceleration sensor, a proximity sensor, a gyro sensor, a temperature sensor, an iris sensor, a temperature/humidity sensor, an illuminance sensor, or TOF sensor.

12. The wearable device of claim 1, wherein the second sensor is electrically connected to multiple electrodes.

13. The wearable device of claim 12, wherein at least one of the multiple electrodes is disposed on a bottom surface of a housing, at least one is disposed on a side surface of the housing, and at least one is disposed on a top surface of the housing.

14. The wearable device of claim 12, wherein the instructions, which are executed by the at least one processor individually or collectively, further cause the wearable device to automatically start inter-beat interval measurement when sensing, through the second sensor, that a first part of a body is brought into contact with at least one of the multiple electrodes.

15. The wearable device of claim 12, wherein the instructions, which are executed by the at least one processor individually or collectively, further cause the wearable device to:
detect that the wearable device enters a measurement mode; and
start inter-beat interval measurement when sensing, through the second sensor, that a first part of the body is brought into contact with at least one of the multiple electrodes.

16. A method of operating a wearable device, the method comprising:
acquiring photoplethysmogram (PPG) signal data by using a first sensor for a first time while the wearable device is worn on a user's body;
acquiring electrocardiogram (ECG) signal data by using a second sensor for the first time for which the PPG signal data is acquired;
calculating a first inter-beat interval of the PPG signal data for the first time and a second inter-beat interval of the ECG signal data for the first time;
determining a personalization algorithm for acquiring an inter-beat interval of the user, the personalization algorithm in which errors between the first inter-beat interval and the second inter-beat interval are smallest;
determining whether a sum of the errors between the first inter-beat interval and the second inter-beat interval is within a predetermined range;
determining an inter-beat interval calculation model-based on the errors, if the sum of the errors between the first inter-beat interval and the second inter-beat interval is within the predetermined range; and
calculating, based on the determined inter-beat interval calculation model, an inter-beat interval of the user from PPG signal data measured for a second time after the first time,
wherein the PPG signal data or the ECG signal data for the first time is re-acquired based on the personalization algorithm, if the sum of the errors between the first inter-beat interval and the second inter-beat interval is outside the predetermined range.

17. The method of claim 16, wherein the inter-beat interval calculation model is determined based on at least one of an inter-beat interval calculation algorithm or a parameter.

18. The method of claim 16, further comprising storing, in a memory, instructions which cause an inter-beat interval to be acquired based on the determined model.

19. The method of claim 16, further comprising determining, based on a result of a comparison between the first inter-beat interval and the second inter-beat interval, whether to continuously measure the inter-beat interval.

20. The method of claim 16, further comprising:
determining one reference point among a highest point, a lowest point, and a maximum slope point of the acquired ECG signal data and the acquired PPG signal data; and
determining the inter-beat interval calculation model, based on a result of comparing intervals between the determined reference points.

* * * * *